(12) United States Patent
Thacker et al.

(10) Patent No.: US 8,551,199 B2
(45) Date of Patent: Oct. 8, 2013

(54) METHOD AND APPARATUS TO RECYCLE TAIL GAS

(75) Inventors: Pradeep S. Thacker, Bellaire, TX (US); George Morris Gulko, Houston, TX (US); Paul Steven Wallace, Katy, TX (US)

(73) Assignee: General Electric Company, Schenectady, NY (US)

( * ) Notice: Subject to any disclaimer, the term of this patent is extended or adjusted under 35 U.S.C. 154(b) by 629 days.

(21) Appl. No.: 12/417,763

(22) Filed: Apr. 3, 2009

(65) Prior Publication Data
US 2010/0251613 A1   Oct. 7, 2010

(51) Int. Cl.
*B01J 7/00* (2006.01)
*C01B 3/36* (2006.01)
*C01B 6/24* (2006.01)
*C10J 3/00* (2006.01)
*B01D 53/02* (2006.01)

(52) U.S. Cl.
USPC ............... 48/197 R; 48/61; 48/210; 423/644; 95/135; 95/136

(58) Field of Classification Search
USPC .................. 48/197 R, 210; 95/135, 136
See application file for complete search history.

(56) References Cited

U.S. PATENT DOCUMENTS

| | | | |
|---|---|---|---|
| 4,155,990 A | 5/1979 | Kimura et al. | |
| 4,781,731 A | 11/1988 | Schlinger | |
| 4,917,024 A | 4/1990 | Marten et al. | |
| 4,957,515 A | 9/1990 | Hegarty | |
| 5,240,476 A | 8/1993 | Hegarty | |
| 5,413,627 A | 5/1995 | Landeck et al. | |
| 6,090,356 A | 7/2000 | Jahnke et al. | |
| 7,374,742 B2 | 5/2008 | Geosits et al. | |
| 2005/0180914 A1* | 8/2005 | Keller et al. | 423/576.8 |
| 2008/0060521 A1 | 3/2008 | Hughes | |

FOREIGN PATENT DOCUMENTS

| | | |
|---|---|---|
| EP | 0560039 A1 | 9/1993 |
| EP | 2216293 A1 | 8/2010 |
| WO | 97/03920 A1 | 2/1997 |
| WO | 2006/113935 A1 | 10/2006 |
| WO | 2008/124767 A2 | 10/2008 |
| WO | 2009/086383 A2 | 7/2009 |
| WO | 2010/075027 A1 | 7/2010 |

OTHER PUBLICATIONS

PCT/US2010/026582, International Search Report and Written Opinion, Sep. 2, 2010.

* cited by examiner

*Primary Examiner* — Matthew Merkling
(74) *Attorney, Agent, or Firm* — Armstrong Teasdale LLP

(57) ABSTRACT

A method of recycling a tail gas includes converting sulfur present in an acid gas stream into elemental sulfur to produce a tail gas and recycling the tail gas to at least one of a gasification reactor and a gas removal subsystem.

13 Claims, 3 Drawing Sheets

METHOD AND APPARATUS TO RECYCLE TAIL GAS

BACKGROUND OF THE INVENTION

The present invention relates generally to gasification systems, and more particularly, to methods and apparatus for recycling tail gas to facilitate enhancing synthetic gas production with a gasification system via acid gas removal.

At least some known gasification plants include a gasification system that is integrated with at least one power-producing turbine system, thereby forming an integrated gasification combined cycle (IGCC) power generation plant. For example, known gasification systems convert a mixture of fuel, air or oxygen, steam, and/or $CO_2$ into a synthetic gas, or "syngas". The syngas is channeled to the combustor of a gas turbine engine, which powers a generator that supplies electrical power to a power grid. Exhaust from at least some known gas turbine engines is supplied to a heat recovery steam generator (HRSG) that generates steam for driving a steam turbine. Power generated by the steam turbine also drives an electrical generator that provides electrical power to the power grid.

At least some known gasification systems associated with IGCC plants initially produce a "raw" syngas fuel that includes carbon monoxide (CO), hydrogen ($H_2$), carbon dioxide ($CO_2$), carbonyl sulfide (COS), and hydrogen sulfide ($H_2S$). $CO_2$, COS, and $H_2S$ are typically referred to as acid gases. Acid gas is generally removed from the raw syngas fuel to produce a "clean" syngas fuel for combustion within the gas turbine engines.

Typically, in known IGCC plants, hydro-carbonaceous feeds are reacted with high purity oxygen (typically 95% oxygen purity) to produce syngas in a temperature range of 2200° F. to 2700° F. The syngas produced is then cooled and scrubbed to produce raw syngas that is suitable for introduction to an acid gas removal (AGR) subsystem. Acid gas removal is performed with the acid gas removal subsystem that typically includes at least one main absorber to remove a majority of $H_2S$ and COS. The acid gas removal subsystem absorbs most of the sulfur present (in the form of $H_2S$ and COS), as well as a portion of $CO_2$ present. This produces a clean syngas stream and an acid gas stream consisting primarily of the absorbed $H_2S$, COS and $CO_2$.

The acid gas stream is treated in a sulfur reduction subsystem to convert sulfur present into elemental sulfur by the Claus reaction. This step consists of first oxidizing some of the hydrogen sulfide present to form sulfur dioxide, and then forming elemental sulfur by the following reaction:

$$2H_2S+SO_2 \rightarrow 3S+2H_2O$$

This reaction occurs in several reactors in series. After each reactor, sulfur is removed as a liquid product. The effluent from the sulfur reduction subsystem consists primarily of carbon dioxide, nitrogen and water vapor, along with unreacted hydrogen sulfide and sulfur dioxide. This effluent is called Claus tail gas.

Claus tail gas usually requires further processing to remove sulfur prior to being released. This step is called tail gas treating. The most common process used is called SCOT (Shell Claus off-gas treating). A SCOT process consists of first hydrogenating the Claus tail gas to convert sulfur dioxide into hydrogen sulfide. The hydrogenated gas is then cooled to enable removal of the water vapor as condensate. An amine solvent is used to capture the hydrogen sulfide. Finally, the solvent is regenerated to produce a hydrogen sulfide-containing stream for recycle to the sulfur recovery unit. The non-absorbed off gas is sent to a thermal oxidizer and emitted.

It has now been discovered that it is possible to eliminate the tail gas treating unit by recycling the Claus tail gas to the gasification reactor. Such a process facilitates eliminating the costs, and complications of treating the Claus tail gas. In addition, a reduced cost Claus unit may be used with a lower recovery or, for example, fewer stages of recovery, since the tail gas is recycled to the gasification reactor. As such, the present invention provides a method and apparatus for treating gas produced in a gasification reactor, for example an IGCC system, comprising recycling gas subjected to acid gas removal and sulfur reduction to the gasification unit of the system without intermediate hydrogenation.

BRIEF DESCRIPTION OF THE INVENTION

In one aspect, a method of recycling a tail gas is provided. The method includes converting sulfur present in an acid gas stream into elemental sulfur to produce a tail gas and recycling the tail gas to at least one of a gasification reactor and a gas removal subsystem.

In another aspect, a method of treating gas produced by a gasification reactor includes directing raw gas produced by the gasification reactor into a gas removal subsystem. Components are removed from the raw gas to produce an acid gas stream and a clean gas stream. The produced acid gas stream is directed into a sulfur reduction subsystem to convert sulfur present in the acid gas stream into elemental sulfur to produce a tail gas. The tail gas is recycled to at least one of the gasification reactor and the gas removal subsystem In a further aspect, an integrated gasification combined-cycle (IGCC) power generation plant is provided. The IGCC power generation plant includes at least one gasification reactor configured to generate a raw gas stream comprising acid gas. At least one gas removal subsystem is coupled in flow communication with the at least one gasification reactor. The at least one gas removal subsystem is configured to remove at least a portion of acid gas from the raw gas stream. At least one sulfur reduction subsystem is coupled in flow communication with the at least one gas removal subsystem. The sulfur reduction subsystem facilitates reducing a sulfur concentration within a stream of gas to produce a tail gas for recycle to at least one of the gasification reactor and the gas removal subsystem.

DETAILED DESCRIPTION OF THE INVENTION

Figure 1:
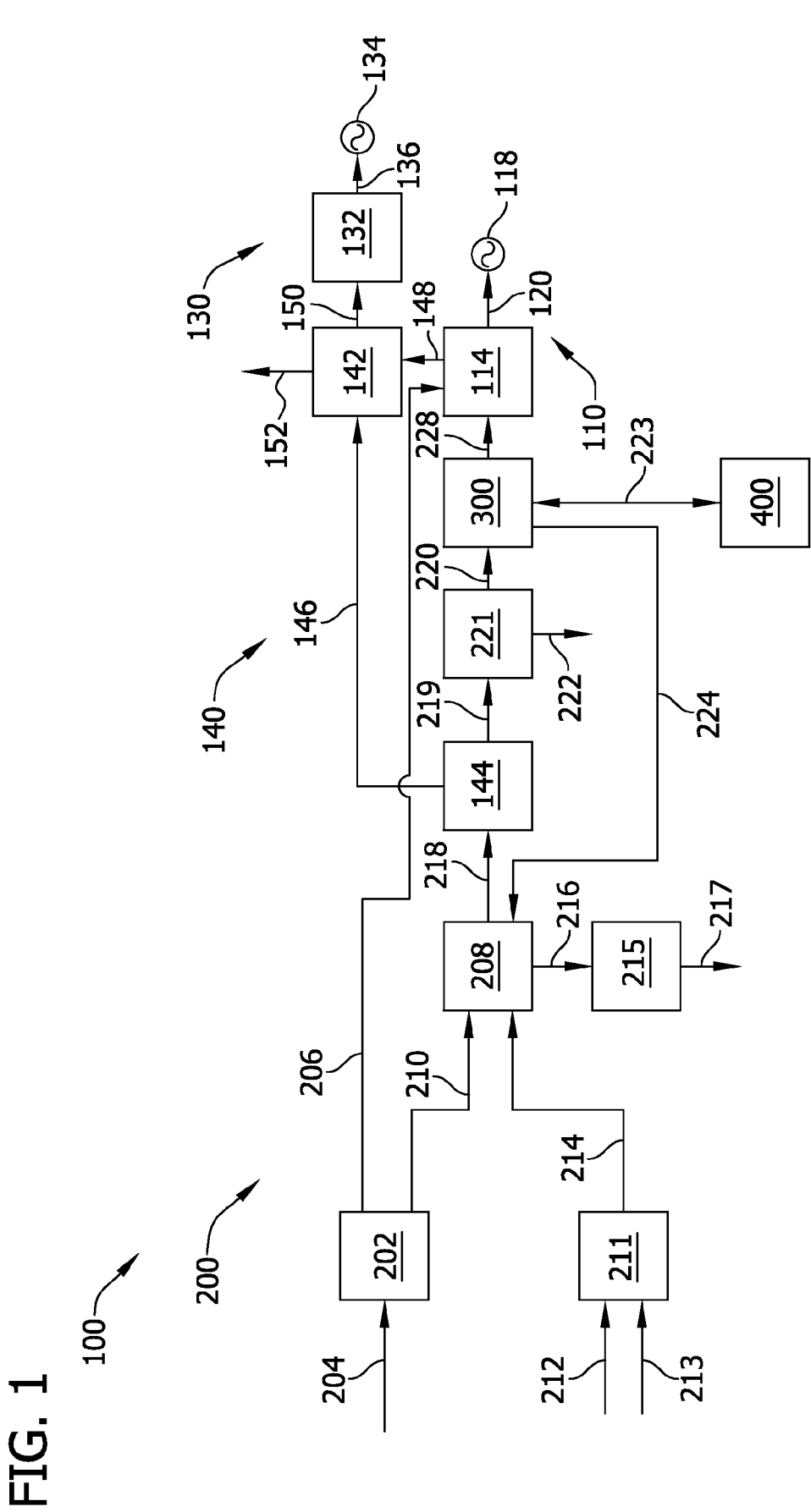
FIG. 1 is a schematic diagram of an exemplary integrated gasification combined-cycle (IGCC) power generation plant.

FIG. 1 is a schematic diagram of an exemplary integrated gasification combined-cycle (IGCC) power generation plant 100. In the exemplary embodiment, IGCC power generation plant 100 includes a gas turbine engine 110. Gas turbine engine 110 includes a turbine 114 that is rotatably coupled to a first electrical generator 118 via a first rotor 120. Turbine 114 is coupled in flow communication with at least one fuel source and at least one air source (both described in more detail below) and is configured to receive the fuel and air from the fuel source and the air source, respectively. Turbine 114 is configured to mix air and fuel, produce hot combustion gases (not shown), and convert the heat energy within the gases to rotational energy. The rotational energy is transmitted to generator 118 via rotor 120, wherein generator 118 is configured to facilitate converting the rotational energy to electrical energy (not shown) for transmission to at least one load, including, but not limited to, an electrical power grid (not shown).

IGCC power generation plant 100 also includes a steam turbine engine 130. In the exemplary embodiment, engine 130 includes a steam turbine 132 that is coupled to a second electrical generator 134 via a second rotor 136.

IGCC power generation plant 100 further includes a steam generation system 140. In the exemplary embodiment, system 140 includes at least one heat recovery steam generator (HRSG) 142 that is coupled in flow communication with at least one heat transfer apparatus 144 via at least one heated boiler feedwater conduit 146. HRSG 142 receives boiler feedwater (not shown) from apparatus 144 via conduit 146 for heating the boiler feedwater into steam. HRSG 142 also receives exhaust gases (not shown) from turbine 114 via an exhaust gas conduit (not shown) to further heat the boiler feedwater into steam. HRSG 142 is coupled in flow communication with turbine 132 via a steam conduit 150. Excess gasses and steam are exhausted from HRSG 142 to the atmosphere via stack gas conduit 152.

Conduit 150 channels steam (not shown) from HRSG 142 to turbine 132. Turbine 132 receives the steam from HRSG 142 and converts the thermal energy in the steam to rotational energy. The rotational energy is transmitted to generator 134 via rotor 136, wherein generator 134 converts the rotational energy to electrical energy (not shown) for transmission to at least one load, including, but not limited to, the electrical power grid. The steam is condensed and returned as boiler feedwater via a condensate conduit (not shown).

IGCC power generation plant 100 also includes a gasification system 200. In the exemplary embodiment, system 200 includes at least one air separation unit 202 that is coupled in flow communication with an air source via an air conduit 204. Such air sources may include, but are not limited to, dedicated air compressors and compressed air storage units (neither shown). Unit 202 separates air into oxygen ($O_2$), nitrogen ($N_2$), and other components (neither shown) that are released via a vent (not shown). The nitrogen is channeled to gas turbine 114 via a $N_2$ conduit to facilitate combustion.

System 200 includes a gasification reactor 208 that is coupled in flow communication with unit 202 to receive the oxygen channeled from unit 202 via an $O_2$ conduit 210. System 200 also includes a coal grinding and slurrying unit 211. Unit 211 is coupled in flow communication with a coal source and a water source (neither shown) via a coal supply conduit 212 and a water supply conduit 213, respectively. Unit 211 mixes the coal and water to form a coal slurry stream (not shown) that is channeled to reactor 208 via a coal slurry conduit 214.

Reactor 208 receives the coal slurry stream and an $O_2$ stream via conduits 214 and 210, respectively. Reactor 208 produces a hot, raw synthetic gas (syngas) stream (not shown), that includes carbon monoxide (CO), hydrogen ($H_2$), carbon dioxide ($CO_2$), carbonyl sulfide (COS), and hydrogen sulfide ($H_2S$). While $CO_2$, COS, and $H_2S$ are typically collectively referred to as acid gases, or acid gas components of the raw syngas, hereon, $CO_2$ will be discussed separately from the remaining acid gas components. Moreover, reactor 208 also produces a hot slag stream (not shown) as a by-product of the syngas production. The slag stream is channeled to a slag handling unit 215 via a hot slag conduit 216. Unit 215 quenches and breaks up the slag into smaller slag pieces wherein a slag removal stream is produced and channeled through conduit 217.

Reactor 208 is coupled in flow communication with heat transfer apparatus 144 via a hot syngas conduit 218. Apparatus 144 receives the hot, raw syngas stream and transfers at least a portion of the heat to HRSG 142 via conduit 146. Subsequently, apparatus 144 produces a cooled raw syngas stream (not shown) that is channeled to a scrubber and low temperature gas cooling (LTGC) unit 221 via a syngas conduit 219. Unit 221 removes particulate matter entrained within the raw syngas stream and discharges the removed matter via a fly ash conduit 222. Unit 221 facilitates cooling the raw syngas stream, and converts at least a portion of COS in the raw syngas stream to $H_2S$ and $CO_2$ via hydrolysis.

System 200 also includes an acid gas removal subsystem 300 that is coupled in flow communication with unit 221 and that receives the cooled raw syngas stream via a raw syngas conduit 220. Subsystem 300 removes at least a portion of acid components (not shown) from the raw syngas stream as discussed further below. Such acid gas components may include, but are not limited to, $CO_2$, COS, and $H_2S$. Subsystem 300 also separates at least some of the acid gas components into components that include, but are not limited to, $CO_2$, COS, and $H_2S$. Moreover, subsystem 300 is coupled in flow communication with a sulfur reduction subsystem 400 via a conduit 223. Subsystem 400 receives and separates at least some of the acid gas components into components that include, but are not limited to, $CO_2$, COS, and $H_2S$. Furthermore, subsystem 400 channels a final integrated gas stream (not shown) to reactor 208 via subsystem 300 and a final integrated gas stream conduit 224. The final integrated gas stream includes predetermined concentrations of $CO_2$, COS, and $H_2S$ that result from previous integrated gas streams (not shown) as discussed further below.

Subsystem 300 is coupled in flow communication with reactor 208 via conduit 224 wherein the final integrated gas stream is channeled to predetermined portions of reactor 208. The separation and removal of $CO_2$, COS, and $H_2S$ via subsystems 300 and 400 facilitate producing a clean syngas stream (not shown) that is channeled to gas turbine 114 via a clean syngas conduit 228.

In operation, air separation unit 202 receives air via conduit 204. The air is separated into $O_2$, $N_2$ and other components. The other components are vented via a vent, the $N_2$ is channeled to turbine 114 via conduit 206 and the $O_2$ is channeled to gasification reactor 208 via conduit 210. Also, in operation, coal grinding and slurrying unit 211 receives coal and water via conduits 212 and 213, respectively, forms a coal slurry stream and channels the coal slurry stream to reactor 208 via conduit 214.

Reactor 208 receives $O_2$ via conduit 210, coal via conduit 214, and the final integrated gas stream from subsystem 300 via conduit 224. Reactor 208 produces a hot raw syngas stream that is channeled to apparatus 144 via conduit 218. The slag by-product formed in reactor 208 is removed via slag handling unit 215 and conduits 216 and 217. Apparatus 144 facilitates cooling the hot raw syngas stream to produce a cooled raw syngas stream that is channeled to scrubber and LTGC unit 221 via conduit 219 wherein particulate matter is removed from the syngas via fly ash conduit 222, the syngas is cooled further, and at least a portion of COS is converted to $H_2S$ and $CO_2$ via hydrolysis. The cooled raw syngas stream is channeled to acid gas removal subsystem 300 wherein acid gas components are substantially removed such that a clean syngas stream is formed and channeled to turbine 114 via conduit 228.

Moreover, during operation, at least a portion of the acid components removed from the syngas stream is channeled to subsystem 400 via conduit 223 wherein acid components are removed and separated such that the final integrated gas stream is channeled to reactor 208 via subsystem 300 and conduit 224. In addition, turbine engine 110 receives $N_2$ and clean syngas via conduits 206 and 228, respectively. Gas turbine engine 110 combusts the syngas fuel, produces hot combustion gases and channels hot combustion gases downstream to induce rotation of turbine 114 which subsequently rotates first generator 118 via rotor 120.

At least a portion of heat removed from the hot syngas via heat transfer apparatus 144 is channeled to HRSG 142 via conduit 146 wherein the heat is used to boil water to form steam. The steam is channeled to steam turbine 132 via conduit 150 and induces rotation of turbine 132. Turbine 132 rotates second generator 134 via second rotor 136.

Figure 2:
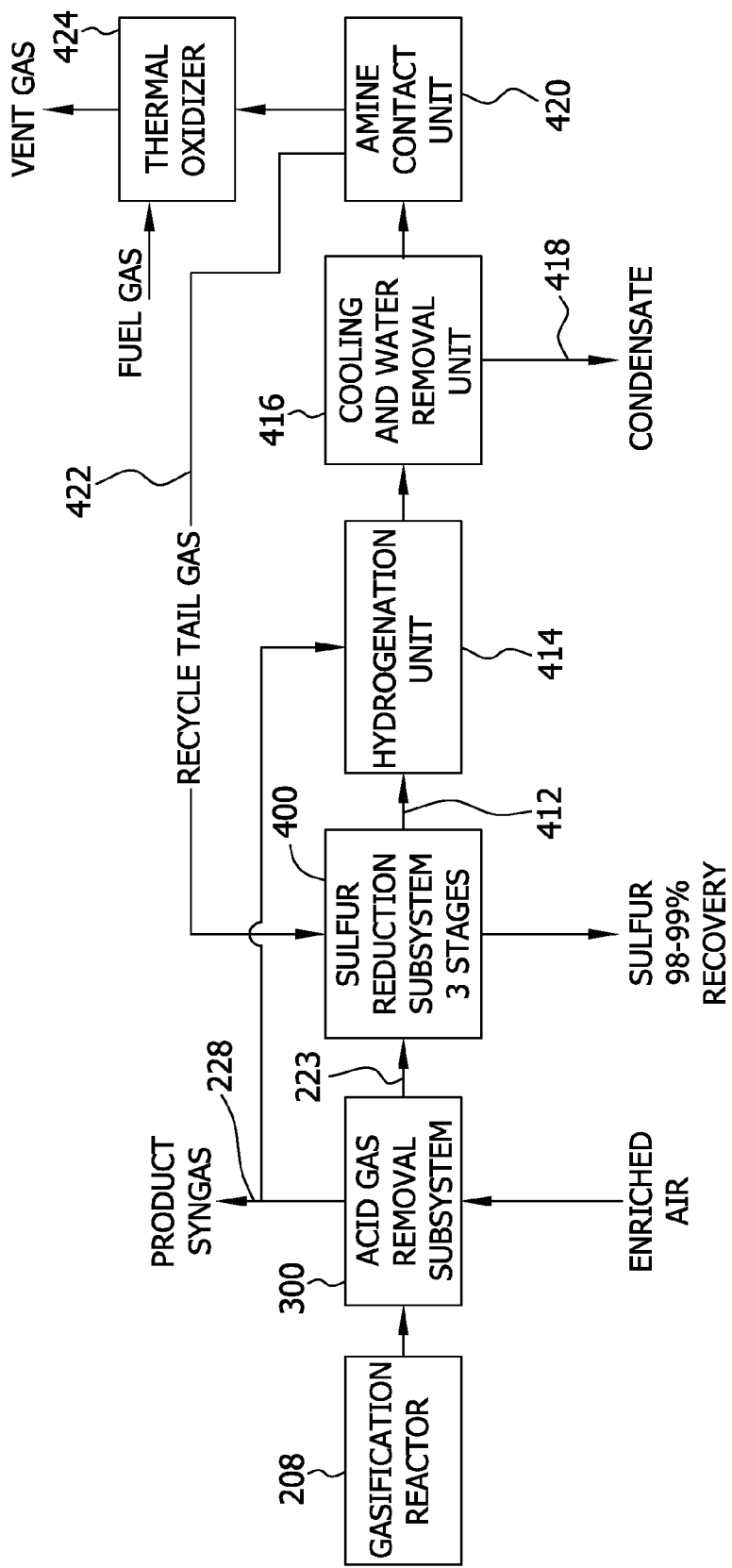
FIG. 2 is a schematic diagram of a conventional gasification unit and method of treating gas produced by the gasification unit.

FIG. 2 is a schematic diagram of a conventional gasification reactor and method of treating gases produced by the gasification reactor 208 of a gasification system, for example, an IGCC power generation plant 100 (shown in FIG. 1). Conventionally, syngas produced in gasification reactor 208 is cooled and scrubbed in a conventional scrubbing unit (not shown) to produce raw syngas that is supplied to acid gas removal (AGR) subsystem 300. The AGR subsystem 300 absorbs sulfur in the form of hydrogen sulfide and COS, together with an amount of carbon dioxide to produce clean syngas via conduit 228 and acid gas stream via conduit 223 consisting primarily of the absorbed hydrogen sulfide, COS and carbon dioxide. Acid gas is channeled to sulfur reduction subsystem 400 for use in converting sulfur present into elemental sulfur via a Claus reaction. In a Claus reaction, initially some of the hydrogen sulfide present is oxidized to form sulfur dioxide. Elemental sulfur is also formed, which may be recovered in a yield of about 95 to 99%. The Claus reaction occurs in several reactors in series, for example, three series reactors. In each reactor in the series, sulfur is removed as a liquid product. Effluent 412 discharged from the sulfur reduction subsystem consists primarily of carbon dioxide, nitrogen and water vapor, along with unreacted hydrogen sulfide and sulfur dioxide. Effluent 412, called Claus tail gas, usually requires additional processing to remove sulfur. This process is called tail-gas treating, and the most common method employed is known as SCOT (Shell Claus off-gas treating). In such a process, the effluent 412 is channeled to hydrogenation unit 414 wherein the Claus tail gas 412 is hydrogenated to convert sulfur dioxide into hydrogen sulfide. The hydrogenated gas is then cooled in cooling unit 416 to permit removal of the water vapor as condensate 418, and the cooled gas is channeled to amine contact unit 420 wherein hydrogen sulfide is captured. The solvent is regenerated to produce a hydrogen sulfide-containing stream 422 that is recycled to sulfur reduction subsystem 400. Any non-absorbed off gases are sent to thermal oxidizer 424.

Figure 3:
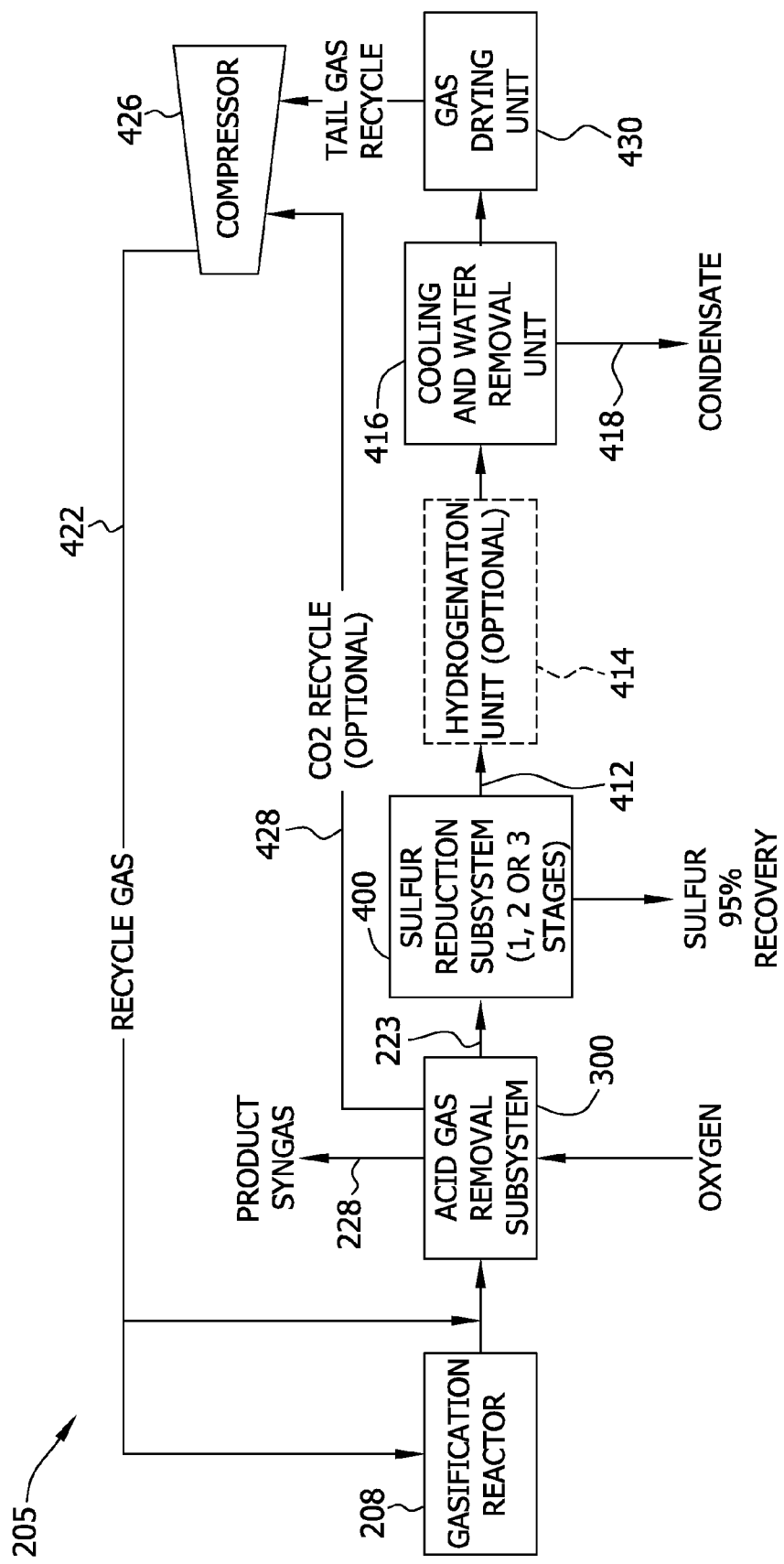
FIG. 3 is a schematic diagram of an exemplary gasification unit and method of treating gas produced by the gasification unit.

FIG. 3 illustrates an exemplary gasification unit 205 and method of treating gases produced by a gasification unit 205, such as unit 200 (shown in FIG. 1). In the exemplary embodiment, hydrogenation unit 414 is optional (as shown by the dashed box) and amine contact unit 420 (as shown in FIG. 2) is eliminated, and Claus tail gas 412 is recycled to at least one of gasification reactor 208 and acid gas removal subsystem 300.

Moreover, in the exemplary embodiment, syngas produced in gasification reactor 208 is cooled and scrubbed to produce raw syngas that is channeled to acid gas removal subsystem 300. Acid gas removal subsystem 300 absorbs sulfur as hydrogen sulfide and COS, together with an amount of carbon dioxide. A clean syngas stream is produced via conduit 228 and an acid gas stream is produced via conduit 223. The acid gas stream primarily includes the absorbed hydrogen sulfide, COS and carbon dioxide. Acid gases are supplied via conduit 223 to sulfur reduction subsystem 400 which converts sulfur present into elemental sulfur via a Claus reaction, as described in more detail above. For example, one, two or three series reactors may be used for this reaction. After each reactor, sulfur is removed as a liquid product. Effluent Claus tail gas 412 discharged from sulfur reduction subsystem 400 consists primarily of carbon dioxide, nitrogen and water vapor, along with unreacted hydrogen sulfide and sulfur dioxide. In an embodiment, effluent tail gas 412 is then directly channeled or directed to cooling unit 416 without an intermediate hydrogenation process and without contact with amine. In an alternative embodiment, effluent tail gas 412 is directed into hydrogenation unit 414 wherein the tail gas is hydrogenated to convert sulfur dioxide into hydrogen sulfide, without contact with amine, and then directed to cooling unit 416. Within cooling unit 416, the gas is cooled to effectively remove water vapor as condensate 418.

The cooled tail gas is then supplied to gas drying unit 430, for example, a glycol or methanol contactor, to facilitate removing remaining trace amounts of water, and thus minimize a corrosiveness effect of the tail gas. After being dried in gas drying unit 430, the tail gas is routed to compressor 426 and is compressed prior to being recycled to at least one of gasification reactor 208 and acid gas removal subsystem 300.

In one embodiment, all the recycled gas is directed to gasification reactor 208. In another embodiment, all the recycled gas is directed to acid gas removal subsystem 300. In a further embodiment, a portion of the recycled gas is directed to gasification reactor 208 and a corresponding portion of the recycled gas is directed to acid gas removal subsystem 300. For example, if 25% of the recycled gas is directed to gasification reactor 208, a corresponding 75% of the recycled gas is directed to acid gas removal subsystem 300.

In an exemplary embodiment, a method is provided for recycling a produced tail gas. In the process, sulfur present in an acid gas stream may be converted into elemental sulfur with no intermediate hydrogenation to produce a tail gas that is recycled to at least one of gasification reactor 208 and acid gas subsystem 300. A raw gas produced by gasification reactor 208 is directed into acid gas removal subsystem 300 and a portion of components from the raw gas are removed to produce the acid gas stream and a clean gas stream. The acid gas stream is routed into sulfur reduction subsystem 400 and sulfur present in the acid gas stream is converted into elemental sulfur to produce a tail gas. In an embodiment, the tail gas is directed into cooling unit 416 to facilitate reducing an operating temperature of the tail gas. In an alternative embodiment, effluent tail gas 412 is directed into hydrogenation unit 414 wherein the tail gas is hydrogenated to convert sulfur dioxide into hydrogen sulfide, without contact with amine, and then directed to cooling unit 416. Within cooling unit 416, the tail gas is cooled to effectively remove water vapor as condensate 418. The cooled tail gas is directed from cooling unit 416 into gas drying unit 430 to facilitate drying the tail gas.

In another exemplary embodiment, the method includes directing the tail gas from sulfur reduction subsystem 400 to compressor 426. Compressor 426 compresses the tail gas prior to the gas being recycled to at least one of gasification reactor 208 and acid gas removal subsystem 300.

In an exemplary embodiment, recycled carbon dioxide 428 from acid gas removal subsystem 300 may optionally be routed to compressor 426 and compressed with the tail gas prior to such gases being recycled to at least one of gasification reactor 208 and acid gas removal subsystem 300. Alternatively, the tail gas may be recycled without contact with amine prior to entering at least one of gasification reactor 208 and acid gas removal subsystem 300.

In a further exemplary embodiment, since a small amount of sulfur dioxide in the tail gas may remain unreacted or unconverted, a COS hydrolysis catalyst may be added to ensure that all the sulfur is reacted or converted to form hydrogen sulfide.

Recycling the tail gas stream to at least one of gasification reactor 208 and acid gas removal subsystem 300, as described herein, facilitates eliminating the costs and complications of treating Claus tail gas in a hydrogenation unit and in an amine contacting unit as is commonly used in conventional plants. Moreover, a reduced cost Claus reaction may be used with a lower recovery or, for example, fewer stages of recovery, since the tail gas is recycled to at least one of gasification reactor 208 and acid gas removal subsystem 300. Costs are also reduced by using a full oxygen blown Claus reaction, rather than by using enriched air, with minimal stages, to achieve, for example, a yield of about 90-95% sulfur recovery.

The savings associated with the optional tail gas hydrogenation unit and the elimination, if desired, of the amine contact unit are projected to be larger than the incremental costs in performing gas drying and compression, and any costs associated with the addition of a hydrogenation catalyst to the existing COS unit. In addition, compression of dry tail gas should have a high reliability and enable the elimination of thermal oxidizer 424 together with its emissions, and normal fuel gas energy consumption. Moreover, the addition of carbon dioxide from the acid gas removal unit to the tail gas and the recycling of a high carbon dioxide content tail gas to at least one of the gasification unit and the acid gas removal subsystem facilitate increasing carbon conversion and CO production, which results in further increases in overall IGCC efficiency.

The method and apparatus for synthetic gas, or syngas, production as described herein facilitates operation of integrated gasification combined-cycle (IGCC) power generation plants, and specifically, syngas production systems. Specifically, increasing hydrogen sulfide ($H_2S$) and carbonyl sulfide (COS) removal from syngas production fluid streams increases syngas production efficiency. More specifically, decreasing the concentration of $H_2S$ and COS in a carbon dioxide ($CO_2$) feed stream to a gasification reactor facilitates decreasing the concentration of impurities within the clean syngas channeled to a gas turbine. Moreover, configuring an integral absorber to remove $H_2S$ and COS on a substantially continuous basis as described herein facilitates optimally operating the syngas production process to facilitate improving IGCC plant production efficiency, thereby facilitating a reduction in operating costs. Furthermore, such method facilitates avoidance of undue emissions release since the reduced concentrations of $H_2S$ and COS facilitate increased operational margins to environmental compliance limits of these compounds. With no venting of tail gas into the environment, substantially all the gas is recycled to at least one of the gasification reactor and the acid gas removal subsystem. Also, the method and equipment for producing such syngas as described herein facilitates reducing capital costs associated with fabricating such IGCC plant.

Exemplary embodiments of syngas production as associated with IGCC plants are described above in detail. The methods, apparatus and systems are not limited to the specific embodiments described herein or to the specific illustrated IGCC plants. Moreover, such methods, apparatus and systems are not limited to IGCC plants and may be embedded within facilities that include, but are not limited to, hydrogen production, Fischer-Tropsch fuel production processes, as well as gasification systems and gas cleaning systems generally.

While the invention has been described in terms of various specific embodiments, those skilled in the art will recognize that the invention can be practiced with modification within the spirit and scope of the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of recycling a tail gas, said method comprising:
   converting sulfur present in an acid gas stream into elemental sulfur to produce a tail gas; and
   recycling a first stream of the tail gas to a gasification reactor and a second stream of the tail gas to a gas removal subsystem, wherein neither the acid gas stream nor the tail gas are treated to separate hydrogen sulfide from the acid gas stream and the tail gas prior to being recycled.

2. A method according to claim 1 further comprising:
   directing raw gas produced by the gasification reactor into the gas removal subsystem; and
   removing components from the raw gas produced by the gasification reactor to produce the acid gas stream and a clean gas stream.

3. A method according to claim 1 further comprising directing the tail gas into a cooling unit to facilitate reducing an operating temperature of the tail gas.

4. A method according to claim 3 further comprising directing the tail gas from the cooling unit into a drying unit to facilitate drying the tail gas.

5. A method according to claim 1 further comprising directing the tail gas from a sulfur reduction subsystem to a compressor.

6. A method according to claim 5 wherein the tail gas is compressed prior to recycling the tail gas.

7. A method according to claim 5 wherein the tail gas is compressed with carbon dioxide from the gas removal subsystem prior to recycling the tail gas.

8. A method according to claim 1 wherein sulfur present in the acid gas stream is converted into elemental sulfur without an intermediate hydrogenation to produce the tail gas.

9. A method of recycling a tail gas produced by a gasification reactor, said method comprising:
   directing raw gas produced by the gasification reactor into a gas removal subsystem;
   removing components from the raw gas to produce an acid gas stream and a clean gas stream;

directing the produced acid gas stream into a sulfur reduction subsystem to convert sulfur present in the acid gas stream into elemental sulfur to produce a tail gas; and recycling the tail gas to the gasification reactor and to the gas removal subsystem via separate streams, wherein neither the acid gas stream nor the tail gas are treated to separate hydrogen sulfide from the acid gas stream and the tail gas prior to being recycled to at least one of the gasification reactor and the gas removal subsystem.

10. A method according to claim 9 further comprising:

directing the tail gas into a cooling unit to facilitate reducing an operating temperature of the tail gas.

11. A method according to claim 10 further comprising:

directing the cooled tail gas from the cooling unit into a drying unit to facilitate drying the tail gas.

12. A method according to claim 9 wherein the tail gas is compressed prior to recycling the tail gas to at least one of the gasification reactor and the gas removal subsystem.

13. A method according to claim 9 wherein the tail gas is recycled to at least one of the gasification reactor and the gas removal subsystem without an intermediate hydrogenation.

\* \* \* \* \*